United States Patent [19]
Ang

[11] Patent Number: 5,914,814
[45] Date of Patent: Jun. 22, 1999

[54] TELECENTRIC LASER BEAM OPTICAL FOCUSING SYSTEM OF TWO DIFFRACTIVE OPTICAL ELEMENTS

[75] Inventor: Anthony Ang, Long Beach, Calif.

[73] Assignee: Xerox Corporation, Stamford, Conn.

[21] Appl. No.: 08/882,976

[22] Filed: Jun. 26, 1997

[51] Int. Cl.[6] .................................................. G02B 27/44
[52] U.S. Cl. ......................... 359/565; 359/569; 359/663
[58] Field of Search .................................... 359/565, 569, 359/663, 16, 19

[56] References Cited

U.S. PATENT DOCUMENTS

| | | | |
|---|---|---|---|
| 4,458,980 | 7/1984 | Ohki et al. ................................. | 359/19 |
| 4,497,534 | 2/1985 | Sincerbox ................................. | 359/19 |
| 4,850,662 | 7/1989 | Chen ....................................... | 359/19 |
| 4,895,790 | 1/1990 | Swanson et al. ....................... | 430/321 |
| 5,237,451 | 8/1993 | Saxe ....................................... | 359/565 |
| 5,422,746 | 6/1995 | Aharoni et al. ......................... | 359/16 |
| 5,450,378 | 9/1995 | Hekker .................................... | 359/15 |
| 5,477,348 | 12/1995 | Yamagishi et al. ..................... | 359/15 |
| 5,606,434 | 2/1997 | Feldman et al. ........................ | 359/19 |
| 5,610,734 | 3/1997 | Aharoni et al. ......................... | 359/19 |

OTHER PUBLICATIONS

G. J. Swanson, Binary Optics Technology: The Theory and Design of Multi–level Diffractive Optical Elements, Technical Report 854, Aug. 14, 1989.

*Primary Examiner*—Cassandra Spyrou
*Assistant Examiner*—John Juba, Jr.
*Attorney, Agent, or Firm*—William Propp

[57] ABSTRACT

A telecentric laser beam optical focusing system consists of two diffractive optical elements. The optical system has a spot size of less than one micron and a Strehl ratio of over 0.9 with a f/number of one and a total object/image field of 0.5 micron.

3 Claims, 1 Drawing Sheet

TELECENTRIC LASER BEAM OPTICAL FOCUSING SYSTEM OF TWO DIFFRACTIVE OPTICAL ELEMENTS

BACKGROUND OF THE INVENTION

This invention relates to a laser beam optical focusing system and, more particularly, to a telecentric optical focusing system with two diffractive optical elements.

Laser beams have wide-ranging applications such as heat annealing or vaporization, optical memory recording and playback, optical scanning and xerographic and printing use. For these diverse applications, a laser beam should be a focused beam. Various optical systems have been proposed over the years to provide focusing means for a laser beam.

Optical focusing systems in modern day apparatus are becoming more accurate on the one hand but more complicated and expensive on the other hand.

A compact design for the focusing optics of any optical system is always desirable to make the entire optical system itself as compact as possible and to enable extension of the same design into many architectures.

It would be desirable to improve the efficiency, shorten optical path lengths and use as few optical elements as possible to decrease hardware, assembly and alignment costs of these types of optical focusing systems.

A semiconductor laser or laser diode emits a diverging light beam. The prior art uses optical elements, typically lenses but sometimes mirrors, to shape and focus the angular diverging beam emitted from a semiconductor laser to a focused spot size.

A single field point in a prior art focusing system with refractive lenses can easily be optimized given enough degrees of freedom in the lenses. However, with a large field of points and a small spot size, the design of an optical focusing refractive lens system is difficult.

Prior art focusing systems typically involve several refractive lens elements configured in an array of lenses. All the lens elements would have to be virtually identical. Fabrication of identical lens elements presents a problem when tolerances have to be on the order of 1 micron or better for refractive elements. Fabrication of lenses by molding involves heat. Heat can cause differences in thickness and refractive index from fabricated lens to fabricated lens, even if the lens are part of the same batch under identical manufacturing circumstances. Also, axial alignment of lens within a focusing system is close to impossible.

The propagation of a light beam can be changed by three basic means: reflection by a mirror, refraction by a lens and diffraction by a grating. Optical systems traditionally rely on reflection and refraction to achieve the desired optical transformation. Optical design, based on mirror and lens elements, is a well-established and refined process. Until recently, the problems with diffraction and fabricating high efficiency diffractive elements have made diffractive elements unfeasible components of optical systems.

The diffractive process does not simply redirect a light beam. Diffraction, unlike refraction and reflection, splits a light beam into many beams—each of which is redirected at a different angle or order. The percentage of the incident light redirected by the desired angle into some given diffraction order is referred to as the diffraction efficiency for that order. The diffraction efficiency of a diffractive element is determined by the element's surface profile. If the light that is not redirected by the desired angle is substantial, the result will be an intolerable amount of scatter in the image or output plane of the optical system.

Theoretically, on-axis diffractive phase elements consisting of a grating having a given period can achieve 100 percent diffraction efficiency. To achieve this efficiency, however, a continuous phase profile within any given period is necessary. The theoretical diffraction efficiency of this surface profile is also relatively sensitive to a change in wavelength. By contrast, refractive elements are relatively wavelength insensitive. The technology for producing high quality, high efficiency, continuous phase profiles of the diffraction grating does not presently exist.

A compromise that results in a relatively high diffraction efficiency and ease of fabrication is a multi-level phase grating. The larger the number of discrete phase levels, the better the approximation of the continuous phase function. These multi-level phase profiles can be fabricated using standard semiconductor integrated circuit fabrication techniques.

As disclosed in Binary Optics Technology: The Theory and Design of Multi-level Diffractive Optical Elements by G. J. Swanson of the Lincoln Laboratory at the Massachusetts Institute of Technology, (Technical Report 854, Aug. 14, 1989) herewithin incorporated by reference and the resulting U.S. Pat. No. 4,895,790 also herewithin incorporated by reference, a fabrication process starts with a mathematical phase description of a diffractive phase profile and results in a fabricated multi-level diffractive surface. The first step is to take the mathematical phase expression and generate from it a set of masks that contain the phase profile information. The second step is to transfer the phase profile information from the masks into the surface of the element specified by the lens design.

The first step involved in fabricating the multi-level element is to mathematically describe the ideal diffractive phase profile that is to be approximated in a multi-level fashion. The next step in the fabrication process is to create a set of lithographic masks which are produced by standard pattern generators used in the integrated circuit industry.

A substrate of the desired material, such as Ge, ZnSe, Si, and $SiO_2$, is coated with a thin layer of photoresist. A first lithographic mask is then placed in intimate contact with the substrate and illuminated from above with an ultraviolet exposure lamp. Alternately, pattern generators, either optical or electron beam, can expose the thin layer of photoresist. The photoresist is developed, washing away the exposed resist and leaving the binary grating pattern in the remaining photoresist. This photoresist will act as an etch stop.

The most reliable and accurate way to etch many optical materials is to use reactive ion etching. The process of reactive ion etching anisotropically etches material at very repeatable rates. The desired etch depth can be obtained very accurately. The anisotropic nature of the process assures a vertical etch, resulting in a true binary surface relief profile. Once the substrate has been reactively ion etched to the desired depth, the remaining photoresist is stripped away, leaving a binary surface relief phase grating.

The process may be repeated using a second lithographic mask having half the period of the first mask. The binary phase element is recoated with photoresist and exposed using the second lithographic mask which has half the period of the first mask. After developing and washing away the exposed photoresist, the substrate is reactively ion etched to a depth half that of the first etch. Removal of the remaining photoresist results in a 4 level approximation to the desired profile. The process may be repeated a third and fourth time with lithographic masks having periods of one-quarter and one-eighth that of the first mask, and etching the substrates to depths of one-quarter and one-eighth that of the first etch. The successive etches result in elements having 8 and 16 phase levels. More masks than four might be used, however, fabrication errors tend to predominate as more masks are used.

This process is repeated to produce a multilevel surface relief phase grating structure in the substrate. The result is a discrete, computer-generated structure approximating the original idealized diffractive surface. For each additional mask used in the fabrication process, the number of discrete phase levels is doubled, hence the name "binary" optical element or, more precisely, a binary diffractive optical element.

After only four processing iterations, a 16 phase level approximation to the continuous case can be obtained. The process can be carried out in parallel, producing many elements simultaneously, in a cost-effective manner.

A 16 phase level structure achieves 99 percent diffraction efficiency. The residual 1 percent of the light is diffracted into higher orders and manifests itself as scatter. In many optical systems, this is a tolerable amount of scatter. The fabrication of the 16 phase level structure is relatively efficient due to the fact that only four processing iterations are required to produce the element.

After the first etching step, the second and subsequent lithographic masks have to be accurately aligned to the existing pattern on the substrate. Alignment is accomplished using another tool standard to the integrated circuit industry, a mask aligner.

As noted, the photoresist on the substrate can be exposed with an electron-beam pattern generator. The e-beam direct-write process eliminates masks and their corresponding alignment and exposure problems. Binary optics have also been reproduced using epoxy casting, solgel casting, embossing, injection molding and holographic reproduction.

Binary optical elements have a number of advantages over conventional optics. Because they are computer-generated, these elements can perform more generalized wavefront shaping than conventional lenses or mirrors. Elements need only be mathematically defined: no reference surface is necessary. Therefore, diffractive optical elements can be made wavelength-sensitive for special laser systems.

The diffractive optical elements are generally thinner, lighter and can correct for many types of aberrations and distortions. It is possible to approximate a continuous phase profile with a stepwise profile of discrete phase levels.

It is an object of this invention to provide a telecentric optical focusing system with diffractive optical elements.

It is another object of this invention to provide a telecentric optical focusing system which is compact and contains inexpensive, easy to manufacture and easy to assemble optical elements.

SUMMARY OF THE INVENTION

In accordance with the present invention, a telecentric laser beam optical focusing system consists of two diffractive optical elements. The optical system has a spot size of less than one micron and a Strehl ratio of over 0.9 with a f/number of one and a total object/image field of 0.5 micron.

Other objects and attainments together with a fuller understanding of the invention will become apparent and appreciated by referring to the following description and claims taken in conjunction with the accompanying drawings.

DESCRIPTION OF THE PREFERRED EMBODIMENT

Figure 1:
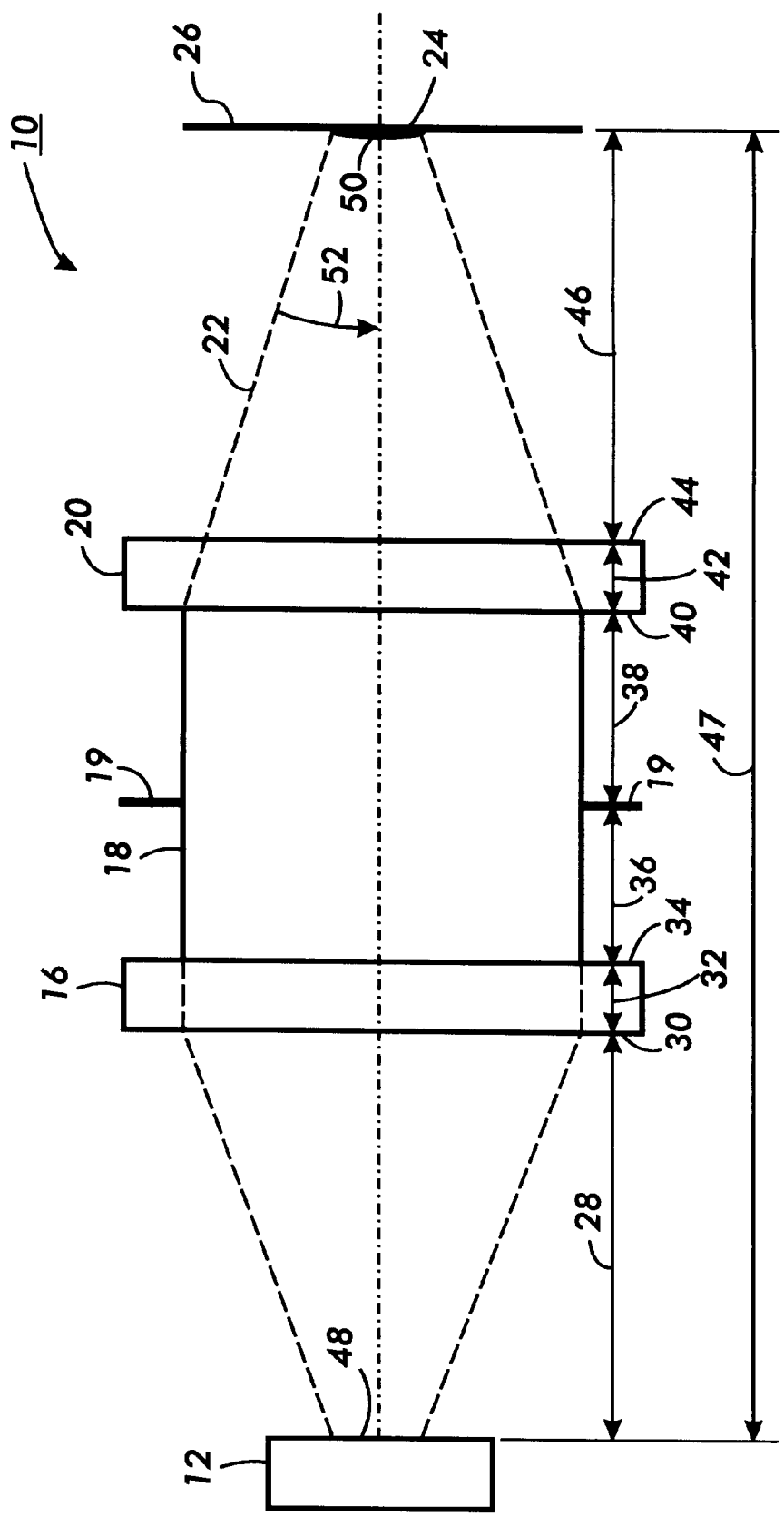
FIG. 1 is a schematic illustration of the telecentric optical focusing system with two diffractive optical elements formed according to the present invention.

Reference is now made to FIG. 1, wherein there is illustrated a telecentric optical focusing system 10 as an embodiment of the present invention. The optical focusing system 10 has a laser source 12 which emits a diverging light beam 14 of a single wavelength. The diverging light beam 14 is incident upon a first diffractive optical element 16 which diffracts and directs the resulting beam 18 past a stop 19 onto a second diffractive optical element 20. The second diffractive optical element 20 diffracts the diffracted beam 18 from the first diffractive optical element and directs the resulting diffracted beam 22 to a spot 24 in the image plane 26.

The two diffractive optical elements 16 and 20 of the optical focusing system 10 receive a diverging beam 14 from the laser 12 and focuses the beam 22 to a spot 24. The optical focusing system 10 is flat field and telecentric.

The laser source 12 is separated by a distance 28 from the front or first or incident surface 30 of the first diffractive optical element 16. The first diffractive optical element 16 has a substrate thickness 32. The back or second or output surface 34 of the first diffractive optical element 16 is separated by a distance 36 from the stop 19.

The stop 19 is separated by a distance 38 from the front or first or incident surface 40 of the second diffractive optical element 20. The second diffractive optical element 20 has a substrate thickness 42. The back or second or output surface 44 of the second diffractive optical element 20 is separated by a distance 46 from the spot 24 on the image plane 26.

The laser source 12 is separated by a total length distance 47 from the spot 24 on the image plane 26.

The object field 48 and image field 50 are 1 to 1 magnification ratio. In the illustrative examples, the size of the object field 48 at the laser source 12 and the size of the image field 50 at the spot 24 at the image plane 26 is 0.5 mm.

The accuracy of an optical focusing system is traditionally measured by the spot size and the Strehl ratio.

The optical focusing system 10 of the present invention is designed to focus a laser beam to a Full Width Half Maximum (FWHM) spot size under 1 micron. The spot 24 size for a perfect diffraction limited optical system follows the following formulas:

$$\text{Spot size} = \delta \lambda f/\# \qquad \text{Equation 1}$$

$$\text{Spot size} = \delta \lambda/(2\ \text{N.A.}) \qquad \text{Equation 2}$$

These two equations determine the smallest spot size obtainable for the optical focusing system 10. The diffraction limit coefficient, $\delta$, is typically 1 for the FWHM spot size. The wavelength in these illustrative examples, $\lambda$, is 780 nm. The f-number, f/#, is the ratio of the focal length over diameter of the exit pupil in an infinite conjugate lens. The numerical aperture, N.A., refers to the cone angle of the light in a finite conjugate system. The N.A. is calculated by:

$$\text{N.A.} = n \sin \theta \qquad \text{Equation 3}$$

where $\theta$ is the half angle 52 of the imaging cone 22 of light and n is the index of refraction of the diffractive optical elements 16 and 20.

For a perfect optical system, the smaller the f/number, the smaller the spot size. The depth of focus for optical systems is proportional to the square of the optical spot size. The criteria for this design is a spot size 24 of 0.78 microns with a Strehl ratio of 0.9.

The Strehl ratio is a measure of the total aberrations in an imaging system, which approaches unity as the value of the total aberrations approach zero. Only an unattainable complete absence of aberrations would result in a Strehl Ratio equal to 1. The Strehl ratio is the ratio of the peak intensity of the optical image in an optical system to the peak intensity of the image for a perfect optical system. A Strehl ratio of 0.8 is generally accepted as a good optical system. A Strehl ratio of over 0.9 quantitatively means the total aberrations introduced by the two diffractive optical elements 16 and 20 in the optical focusing system 10 should be negligible.

An f/1 optical system has a very small depth of focus, on the order of less than 1 micron. One of the benefits of using binary diffractive optical elements over a lens system is that diffractive optical elements allows the optical focusing system to keep a Strehl ratio over 0.9 with a total object/image field of 0.5 mm.

A diffractive optical element has a diffractive phase profile on the surface of the substrate. Each diffractive optical element 16 and 20 has a different diffractive phase profile on each side of the diffractive optical element.

The diffractive optical elements 16 and 20 have circular or rotational symmetry.

Since the first and second diffractive optical elements are circularly symmetrical, the diffractive phase profile, $\Phi$, at the radial position, $\rho$, can therefore be expressed as $$\Phi(\rho)=c_1\rho^2+c_2\rho^4+c_3\rho^6+c_4\rho^8+c_5\rho^{10} \qquad \text{Equation 4}$$

This diffractive phase profile is fabricated by masks in the photoresist on the surface of the substrate to form the diffractive optical element.

Commercially available CODE V optical design software can be used to optimize the $c_x$ polynomial coefficients for the diffractive phase profile $\Phi$. The CODE V will also optimize the curvatures of the surfaces, the thickness and the spacings of the diffractive optical element.

As an illustrative example of the optical focusing system 10 of the present invention, the wavelength of the emitted light beam 14 from the laser source 12 is 780 nm. The object field 48 is 0.5 mm. The distance 28 from the laser source 12 to the incident surface 30 of the first diffractive optical element 16 is 0.9 mm. The $c_x$ polynomial coefficients for the diffractive phase profile of the incident surface 30 of the first diffractive optical element are

| C1: 3.0422E – 01 | C2: –7.6436E – 03 | C3: 3.1916E – 03 |
|---|---|---|
| C4: 1.6479E – 04 | C5: –3.4506E – 03 | |

The substrate of the first diffractive optical element 16 is BK7 Shott glass which is 1.5 mm thick. The $c_x$ polynomial coefficients for the diffractive phase profile of the output surface 34 of the first diffractive optical element are

| C1: 1.7168E – 01 | C2: –2.3595E – 02 | C3: 5.7685E – 04 |
|---|---|---|
| C4: –1.0910E – 03 | C5: 2.1972E – 03 | |

The output surface 34 of the first diffractive optical element 16 is separated from the stop 19 by a distance 36 of 0.496679 mm. The stop 19 is separated from the incident surface 40 of the second diffractive optical element 20 by a distance 38 of 0.471033 mm. The $c_x$ polynomial coefficients for the incident or first side 40 of the second diffractive optical element are

| C1: –1.5537E – 01 | C2: 4.5906E – 02 | C3: 9.7831E – 03 |
|---|---|---|
| C4: 5.4507E – 03 | C5: 4.4001E – 04 | |

The substrate of the second diffractive optical element 20 is BK7 Shott glass which is 1.5 mm thick. The $c_x$ polynomial coefficients for the diffractive phase profile of the output surface 44 of the second diffractive optical element are

| C1: –3.1303E – 01 | C2: –1.5724E – 02 | C3: –2.3776E – 03 |
|---|---|---|
| C4: 3.7538E – 04 | C5: 1.6263E – 03 | |

The output surface 44 of the second diffractive optical element 20 is separated from the spot 24 on the image plane 26 by a distance 46 of 0.9 mm. The image field 50 is 0.5 mm. The magnification ratio is 1 to 1.

The spot size 24 is 0.78 microns with a Strehl ratio of 0.9.

The total length distance 47 of the optical focusing system 10 from the laser source 12 to the spot 24 on the image plane 26 is 5.767712 mm.

As shown by this illustrative example, the telecentric optical focusing system of the present invention using two diffractive optical elements forms a spot with a size under 1 micron and has a Strehl ratio of 0.9. The optical focusing system is flat-field, compact, and consists of only a few inexpensive, easy to manufacture and easy to assemble optical elements.

While the invention has been described in conjunction with specific embodiments, it is evident to those skilled in the art that many alternatives, modifications and variations will be apparent in light of the foregoing description. Accordingly, the invention is intended to embrace all such alternatives, modifications and variations as fall within the spirit and scope of the appended claims.

I claim:

1. A telecentric optical focusing system comprising
   a laser light source for emitting a light beam of a single wavelength,
   a first diffractive optical element for diffracting said light beam, said first diffractive optical element being circularly symmetric,
   a second diffractive optical element, said second diffractive optical element being circularly symmetric, for diffracting said light beam from said first diffractive optical element to a spot,
   wherein the object field of said telecentric optical focusing system is 0.5 millimeters and the image field of said telecentric optical focusing system is 0.5 millimeters and wherein said spot size is less than one micron and said telecentric optical focusing system has a Strehl ratio of over 0.9.

2. The telecentric optical focusing system of claim 1 wherein the first diffractive optical element has a first surface with a diffractive phase profile and a second surface with a diffractive phase profile and wherein the second diffractive optical element has a first surface with a diffractive phase profile and a second surface with a diffractive phase profile, further wherein each of the diffractive phase profiles, $\Phi$, with regard to a position, $\rho$, on the surface is defined by $$\Phi(\rho)=c_1\rho^2+c_2\rho^4+c_3\rho^6+c^4\rho^8+c_5\rho^{10}$$

where $c_x$ are the polynomial coefficients.

3. The telecentric optical focusing system of claim 2 wherein the polynomial coefficients of the diffractive phase profile of the first surface of the first diffractive optical element are

| | | |
|---|---|---|
| C1: 3.0422E − 01 | C2: −7.6436E − 03 | C3: 3.1916E − 03 |
| C4: 1.6479E − 04 | C5: −3.4506E − 03, | | further wherein the polynomial coefficients of the diffractive phase profile of the second surface of the first diffractive optical element are

| | | |
|---|---|---|
| C1: 1.7168E − 01 | C2: −2.3595E − 02 | C3: 5.7685E − 04 |
| C4: −1.0910E − 03 | C5: 2.1972E − 03, | | further wherein the polynomial coefficients of the diffractive phase profile of the first surface of the second diffractive optical element are

| | | |
|---|---|---|
| C1: −1.5537E − 01 | C2: 4.5906E − 02 | C3: 9.7831E − 03 |
| C4: 5.4507E − 03 | C5: 4.4001E − 04, | | and further wherein the polynomial coefficients of the diffractive phase profile of the second surface of the second diffractive optical element are

| | | |
|---|---|---|
| C1: −3.1303E − 01 | C2: −1.5724E − 02 | C3: −2.3776E − 03 |
| C4: 3.7538E − 04 | C5: 1.6263E − 03. | |

* * * * *